JAMES CURTIS.
Improvement in Boiler Washing-Machines.
No. 115,174. Patented May 23, 1871.
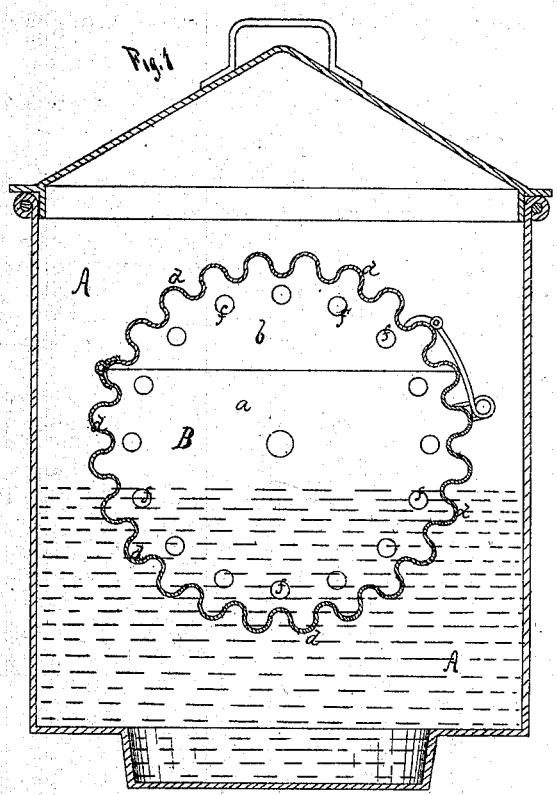
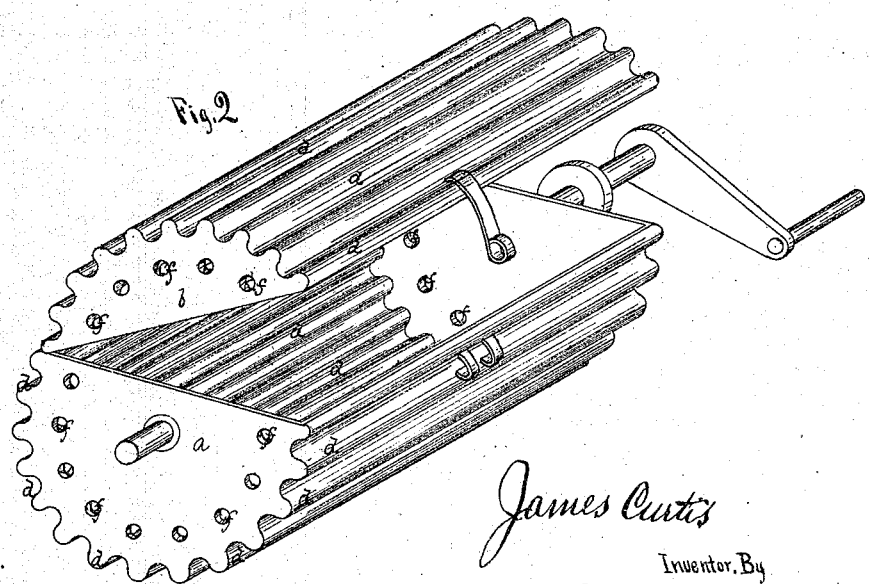
Witnesses.
James Curtis
Inventor. By
J. Fraser & Co. Attys 115,174

UNITED STATES PATENT OFFICE.

JAMES CURTIS, OF NORTH PARMA, NEW YORK.

IMPROVEMENT IN BOILER WASHING-MACHINES.

Specification forming part of Letters Patent No. 115,174, dated May 23, 1871.

*To all whom it may concern:*

Be it known that I, JAMES CURTIS, of North Parma, in the county of Monroe and State of New York, have invented a certain new and useful Improvement in Boiler Washing-Machines, of which the following is a specification:

Nature of the Invention.

This invention consists in combining with a wash-boiler a corrugated metallic cylinder or drum, which is closed on its periphery, but perforated at its ends, in the manner and for the purpose hereinafter described.

General Description.

In the drawing, Figure 1 is a vertical cross-section of my improvement; Fig. 2, a perspective view of the cylinder removed from the boiler and partly open.

A represents the boiler, and B the cylinder. The boiler may be of ordinary construction. The cylinder is made of metal and constructed in two parts, a and b, which form the body and lid. These are hinged together and secured by a hasp or otherwise, so that when closed the whole forms a tight cylinder. The periphery of this receptacle is made entirely closed, having no slatted or open work, as is common in other devices. It is formed into a series of regular corrugations or flutes, d d, which, on the inside, constitute the rubbing-surface. The ends are made closed, but have a series of holes, f f, arranged in a circle all the way around, for the purpose of admitting water to the interior. The holes are arranged near the outer edge of the heads, and in this consists one of the main features of my invention, as thereby the water inside the receptacle is made to stand in a heavy body above the main portion of the holes that admit it, and is not so readily thrown out by the turning action.

The clothes to be washed are placed inside the cylinder and revolved. The corrugations produce the rubbing action without allowing any entrance or exit of water at the periphery. The body of water is held fast, so to speak, by the closed heads of the cylinder, and yet the holes allow the necessary circulation to keep clear of the dirt and sediment. The washing is produced by a heavy surging of the liquid rather than by the raising of the same by cups, as in other boiler-washers. This close retention of the body of water is much more effective than in an open cylinder, where the centrifugal action has a tendency to throw it off. Another advantage is that the holes, being located close to the outer edge of the circle, allow the water to flow in endwise through the flutes or corrugations behind the body of clothes.

I am aware that cylinders for holding the clothes have before been used, both in boiler and ordinary washing machines. Such I do not claim, broadly.

What I claim, and desire to secure by Letters Patent, is—

The combination, with the wash-boiler A, of the cylinder B, constructed with a closed periphery formed into a series of flutes or corrugations, and with closed ends perforated near the outer edge with a series of holes, as herein described, and for the purpose specified.

In witness whereof I have hereunto set my hand this 27th day of March, 1871.

JAMES CURTIS.

Witnesses:
  R. F. OSGOOD,
  ARCHIE BAINE.